United States Patent
Lee et al.

(10) Patent No.: US 11,973,431 B2
(45) Date of Patent: Apr. 30, 2024

(54) SWITCHING POWER SUPPLY APPARATUS

(71) Applicants: SANKEN ELECTRIC CO., LTD., Niiza (JP); SANKEN ELECTRIC KOREA CO., LTD., Seoul (KR)

(72) Inventors: Eunsuk Lee, Seoul (KR); Kyusam Choi, Seoul (KR); Jaekuk Yu, Seoul (KR); Shinji Aso, Niiza (JP); Mitsutomo Yoshinaga, Niiza (JP); Hanju Kang, Niiza (JP)

(73) Assignees: SANKEN ELECTRIC CO., LTD., Niza (JP); SANKEN ELECTRIC KOREA CO., LTD., Seoui (KR)

( * ) Notice: Subject to any disclaimer, the term of this patent is extended or adjusted under 35 U.S.C. 154(b) by 253 days.

(21) Appl. No.: 17/715,090

(22) Filed: Apr. 7, 2022

(65) Prior Publication Data
US 2023/0327569 A1    Oct. 12, 2023

(51) Int. Cl.
*H02M 3/335* (2006.01)
*H02M 1/08* (2006.01)

(52) U.S. Cl.
CPC ... *H02M 3/33592* (2013.01); *H02M 3/33571* (2021.05); *H02M 1/08* (2013.01)

(58) Field of Classification Search
CPC ......... H02M 3/33592; H02M 3/33571; H02M 1/0038; H02M 1/0048; H02M 3/01
See application file for complete search history.

(56) References Cited

U.S. PATENT DOCUMENTS

| 9,356,535 | B2 | 5/2016 | Iorio et al. | |
|---|---|---|---|---|
| 2013/0051088 | A1* | 2/2013 | Yamashita | H02M 3/33523 363/21.13 |
| 2013/0057323 | A1* | 3/2013 | Spini | H02M 3/33553 327/142 |
| 2013/0194836 | A1* | 8/2013 | Morris | H02M 1/32 363/21.17 |
| 2013/0272036 | A1* | 10/2013 | Fang | H02M 3/33515 363/21.17 |
| 2014/0003097 | A1* | 1/2014 | Sakurai | H02M 3/33592 363/21.14 |

(Continued)

FOREIGN PATENT DOCUMENTS

JP    5867141 B2    2/2016

*Primary Examiner* — Yusef A Ahmed
(74) *Attorney, Agent, or Firm* — METROLEX IP LAW GROUP, PLLC (57) ABSTRACT

A detector compares a drain voltage with a first threshold voltage and outputs a first detection signal. An ON-counter detects a period of time during which current flows in a switching circuit based on the first detection signal, counts the period of time based on a predetermined clock cycle, and outputs an ON-count value. A first comparator receives the ON-count value and an ON-threshold value and outputs a first comparison signal when the ON-count value and the ON-threshold value match. A second comparator receives the ON-count value and a decreased ON threshold value, compares the ON-count value and the decreased ON-threshold value, and outputs a second comparison signal. An ON-mask time adjuster receives the second comparison signal and outputs an ON-threshold value for adjusting a mask time and a decreased ON-threshold value that is less than the ON threshold value.

9 Claims, 4 Drawing Sheets

(56) References Cited

U.S. PATENT DOCUMENTS

| | | | |
|---|---|---|---|
| 2015/0023062 A1* | 1/2015 | Hyugaji | H02M 3/33592 363/16 |
| 2015/0049521 A1* | 2/2015 | Iorio | H02M 3/33592 363/21.02 |
| 2015/0049522 A1* | 2/2015 | Iorio | H02M 3/1588 363/21.03 |
| 2015/0049529 A1* | 2/2015 | Iorio | H02M 3/33507 363/89 |
| 2015/0102793 A1* | 4/2015 | Chen | H02M 3/1588 323/282 |
| 2016/0072399 A1* | 3/2016 | Kikuchi | H02M 1/32 363/21.14 |
| 2016/0126848 A1* | 5/2016 | Sasaki | H02M 1/32 363/21.13 |
| 2016/0190942 A1* | 6/2016 | Kikuchi | H02M 3/33576 363/21.14 |
| 2016/0261204 A1* | 9/2016 | Kikuchi | H02M 3/33523 |
| 2017/0040904 A1* | 2/2017 | Kikuchi | H02M 1/08 |
| 2017/0358994 A1* | 12/2017 | Ueno | H02M 3/33592 |
| 2018/0083543 A1* | 3/2018 | Hara | H02M 1/32 |
| 2018/0212527 A1* | 7/2018 | Kong | H02M 3/33592 |
| 2018/0301999 A1* | 10/2018 | Moon | H02M 3/33592 |
| 2020/0280264 A1* | 9/2020 | Kado | H02M 3/33592 |
| 2020/0313562 A1* | 10/2020 | Hyugaji | H02M 3/33507 |
| 2020/0313563 A1* | 10/2020 | Hyugaji | H02M 3/33592 |
| 2021/0143725 A1* | 5/2021 | Deng | H02M 1/0048 |
| 2023/0198370 A1* | 6/2023 | Takehana | H02M 1/342 363/13 |
| 2023/0327568 A1* | 10/2023 | Lee | H02M 1/0012 363/21.02 |
| 2024/0014741 A1* | 1/2024 | Imade | H02M 3/33507 |

* cited by examiner

FIG. 4

SWITCHING POWER SUPPLY APPARATUS

BACKGROUND

The present disclosure relates to a switching controlled power supply device with a transformer for power conversion, and in particular, to a current resonance-type switching power supply apparatus that includes a series resonance-type circuit on a primary side of a transformer and a synchronous rectification switch on a secondary side.

Japanese Published Patent Grant No. 5867141 (B2) to Hyugaji et al. ("Hyugaji"), discloses a current resonance-type switching power supply apparatus with a series resonance circuit on a primary side of a transformer and a synchronous rectification switch on a secondary side of the transformer. A secondary-side control circuit in Hyugaji is provided with a reference voltage circuit that generates a reference voltage of a predetermined potential, an on-timing detection circuit that monitors a terminal voltage of a switching element for the synchronous rectification and detects the on-timing of the element, an off-timing detection circuit that detects the off-timing of the switching element for the synchronous rectification, and a timer circuit that is activated in response to the on-timing and measures predetermined time. While the timer circuit is in a measuring operation, a voltage that is a reference voltage plus a predetermined offset voltage is supplied to the off-timing detection circuit as a threshold voltage. While the timer circuit stops the measuring operation, a reference voltage generated by the reference voltage circuit is supplied to the off-timing detection circuit as a threshold voltage.

Hyugaji discloses that ON/OFF control of synchronous rectification enables detection of a Vds voltage of a synchronous rectification field effect transistor (may be referred to as SR-FET) and turns on the Vds voltage when the voltage is at a threshold value Vth_off or below. Hugaji discloses that an offset voltage Voffset is added to the reference voltage immediately after turning on, and an ON operation is held for a predetermined time Tadd, so that an ON/OFF operation is not repeated immediately after the SR-FET is turned on.

However, in the current resonance-type switching power supply apparatus disclosed in Hyugaji, an LLC converter has a capacitive current flow due to parasitic capacitance (Cs) on the secondary side. The capacitive current is observed as a current spike during an initial period when a current begins to flow in a body diode (BD) of the SR-FET. When a load current is large, a rectification current flows simultaneously with the current spike, but when the load current is small, the rectification current flows after the current spike oscillates and flows. Therefore, in an LLC synchronous rectification IC, when the SR-FET is turned on by the capacitive current, a reverse current flows from an output capacitor to the SR-FET and the rectification current increases to compensate for the discharged current, causing an increase in a circuit current, which results in losses and a decrease in efficiency.

SUMMARY

A switching power supply apparatus according to one or more embodiments may include a series resonance circuit on a primary side; a rectification smoothing circuit on a secondary side; and a transformer that comprises a first coil connected to the series resonance circuit on the primary side and a second coil connected to the rectification smoothing circuit on the secondary side, and produces a current in the second coil in response to a current in the first coil. The rectification smoothing circuit on the secondary side may include a switching circuit that is used for synchronous rectification connected in series with the second coil; and a secondary-side control circuit that controls ON and OFF of the switching circuit. The secondary-side control circuit may include a detector that compares a drain voltage of the switching circuit with a first threshold voltage and outputs a first detection signal; an ON counter that detects a period of time during which current flows in the switching circuit based on the first detection signal, counts the period of time based on a predetermined clock cycle, and outputs an ON count value; a first comparator that receives the ON count value and an ON threshold value and outputs a first comparison signal when the ON count value and the ON threshold value match; a second comparator that receives the ON count value and a decreased ON threshold value, compares the ON count value and the decreased ON threshold value, and outputs a second comparison signal; an ON-mask time adjuster that receives the second comparison signal and outputs an ON threshold value for adjusting a mask time and a decreased ON threshold value that is less than the ON threshold value; and an SR-latch that receives the first comparison signal and outputs a PWM signal to be applied to a gate of the switching circuit.

DETAILED DESCRIPTION

A switching power supply apparatus according to one or more embodiments is described.

Figure 1:
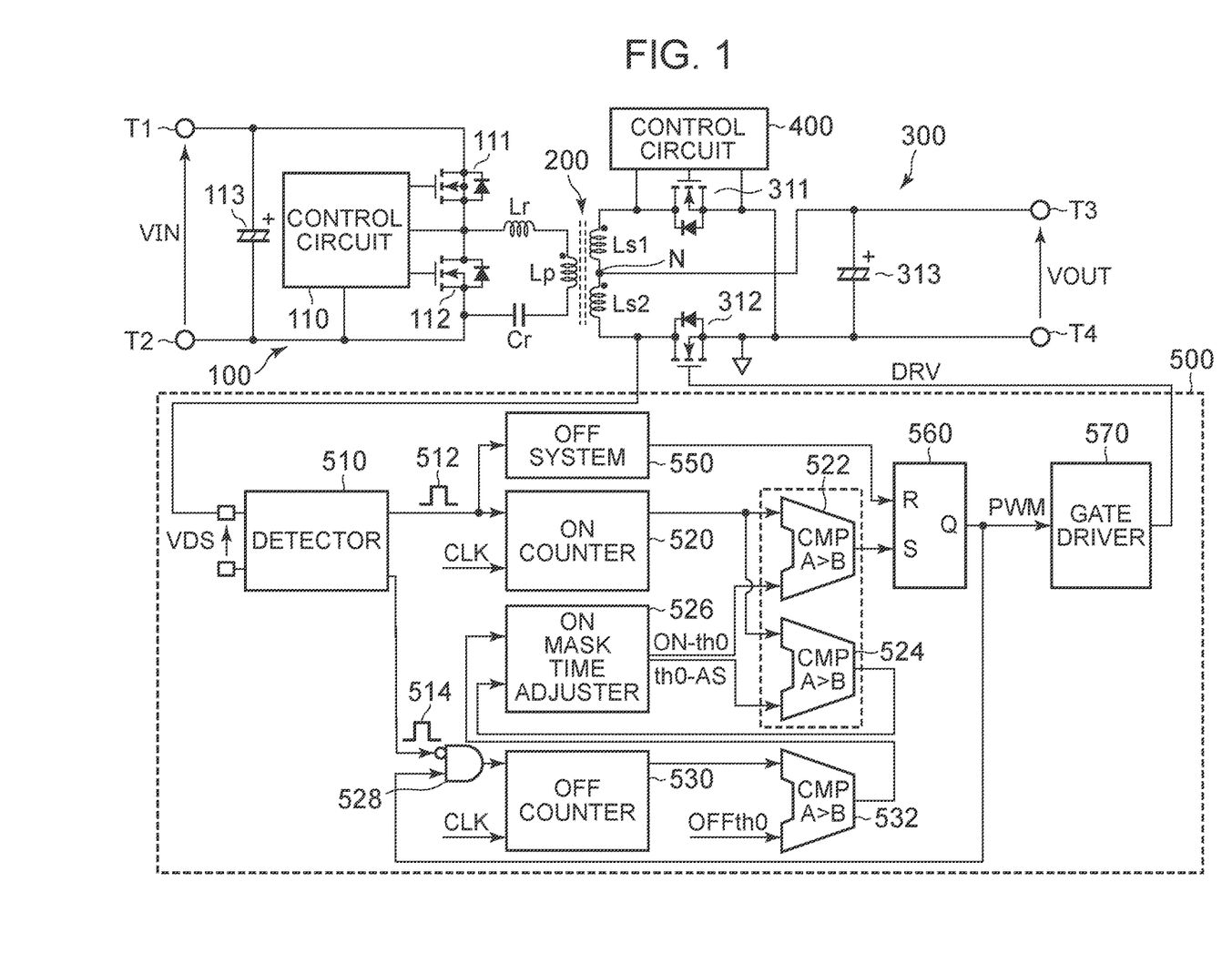
FIG. 1 is a block diagram illustrating a switching power supply apparatus according to one or more embodiments.

FIG. 1 is a block diagram illustrating a switching power supply apparatus according to one or more embodiments. The switching power supply apparatus includes a resonance circuit 100 on a primary side, a transformer 200, and a rectification smoothing circuit 300 on secondary side. A first control circuit 400 and a second control circuit 500 are connected to the rectification smoothing circuit 300 on the secondary side. The resonance circuit 100 includes a coil Lp of the transformer 200, a resonance inductor Lr connected in series with the coil Lp, a resonance capacitor Cr connected in series with the coil Lp, and a capacitor 113. The resonance circuit 100 includes voltage input terminals T1 and T2 to which an input voltage VIN from a voltage source (not illustrated in the figure) is applied. The voltage source (not illustrated in the figure) may be a DC voltage source providing a DC voltage. The resonance circuit 100 also includes switching circuits 111 and 112 with N-channel MOS transistors and a control circuit 110, which is connected to gates of the switching circuits 111 and 112 and controls the resonance circuit 100 of the primary side. The control circuit 110 alternately controls the switching circuits 111 and 112 to turn on and off at a frequency near a resonance frequency, which causes the coil Lp of the primary side to generate a sinusoidal current. When the sinusoidal current flows in the coil Lp of the primary side, the transformer 200 generates a potential difference in a first coil Ls1 and a second coil Ls2 on the secondary side through an action of electromagnetic induction, which causes a current to flow in the first coil Ls1 and the second coil Ls2 on the secondary side.

The rectification smoothing circuit 300 on the secondary side includes a switching circuit 311 for synchronous rectification connected between the first coil Ls1 and output terminals T3 and T4, a switching circuit 312 connected between the second coil Ls2 and the output terminals T3 and T4, the first control circuit 400 that detects a source-to-drain voltage of the switching circuit 311 and generates ON and OFF control signals for the switching circuit 311, and the second control circuit 500 that detects a drain voltage (source-to-drain voltage) of the switching circuit 312 and generates ON and OFF control signals for the switching circuit 312. Switching circuits 311 and 312 may be synchronous rectification field effect transistors or synchronous rectification MOSFET (synchronous rectification metal oxide semiconductor field effect transistors).

The first control circuit 400 and the second control circuit 500 control the switching circuits 311 and 312 complementarily to be on and off, respectively. The first control circuit 400 may turn on the switching circuit 311 in a first or second half of one cycle of a switching control of the control circuit 110, and the second control circuit 500 may turn on a switching circuit 312 in the second or first half of one cycle of a switching control of the control circuit 110. In the rectification smoothing circuit 300, a smoothing capacitor 313 that stabilizes an output voltage VOUT applying to the output terminals T3 and T4 is included, and the output terminal T3 is connected to the midpoint of the secondary side coils of the transformer 200 (a connection node N between the first coil Ls1 and the second coil Ls2). The input terminals T1 and T2 may be connected to a power source (not illustrated in the figure), and the output terminals T3 and T4 may be connected to a load (not illustrated in the figure) in an operation.

The first control circuit 400 and the second control circuit 500 connected to the rectification smoothing circuit 300 on the secondary side are described. The first control circuit 400 may be configured identical to the second control circuit 500. The first control circuit 400 may be identical in operation to the second control circuit 500. The first control circuit 400 may be identical to the second control circuit 500 with the timing of operation being half a cycle off.

The second control circuit 500 includes a detector 510, an ON counter 520, a first comparator 522, a second comparator 524, and an ON-mask time adjuster 526. The second control circuit 500 may include an OFF system 550 that controls the switching circuit (transistor) 312 to be off. The detector 510 detects the voltage polarity of the switching circuit 312. The detector 510 receives at least a portion of the current flowing in the switching circuit 312. The voltage associated with the current may be referred to as VDS. The voltage VDS is a drain-to-source voltage of the switching circuit 312. The detector 510 receives the voltage VDS, compares the voltage VDS with a threshold voltage ONth, and outputs a first detection signal 512. The ON counter 520 measures time that the switching circuit 312 is conducting and adjusts the timing when a PWM signal should be output after a predetermined mask time. The ON counter 520 inputs the first detection signal 512 output by the detector 510 and a clock signal CLK. The ON counter 520 counts up an ON count value based on the period during which the first detection signal 512 is ON. The ON counter 520 outputs a counter value (GON-COUNT) that quantifies the period of ON according to a time interval based on the clock signal CLK. The first comparator 522 inputs the ON counter value GON-COUNT output by the ON counter 520 and an ON threshold value ON-th0. The first comparator 522 compares the ON counter value GON-COUNT with the ON threshold value ON-th0 and outputs a first comparison signal when the ON counter value GON-COUNT and the ON threshold value ON-th0 match. The second comparator 524 inputs the ON counter value GON-COUNT, which is the output of the ON counter 520, and a decreased ON threshold value th0-AS, and outputs a second comparison signal. The ON-mask time adjuster 526 at least receives a comparison result of the second comparator 524, and outputs the ON threshold value ON-th0 and the decreased ON threshold value th0-AS, which is smaller than the ON threshold value ON-th0, to adjust the next mask time.

A (set-reset) SR latch 560 receives the first comparison signal from the first comparator 522 and outputs a PWM signal under a predetermined condition. A gate driver 570 receives the PWM signal from the SR latch 560. The gate driver 570 outputs a drive voltage DRV to the switching circuit 312 to control ON/OFF of a gate of the switching circuit 312. The gate terminal of the switching circuit 312 receives the drive voltage DRV and operates based on the drive voltage DRV.

Figure 2:
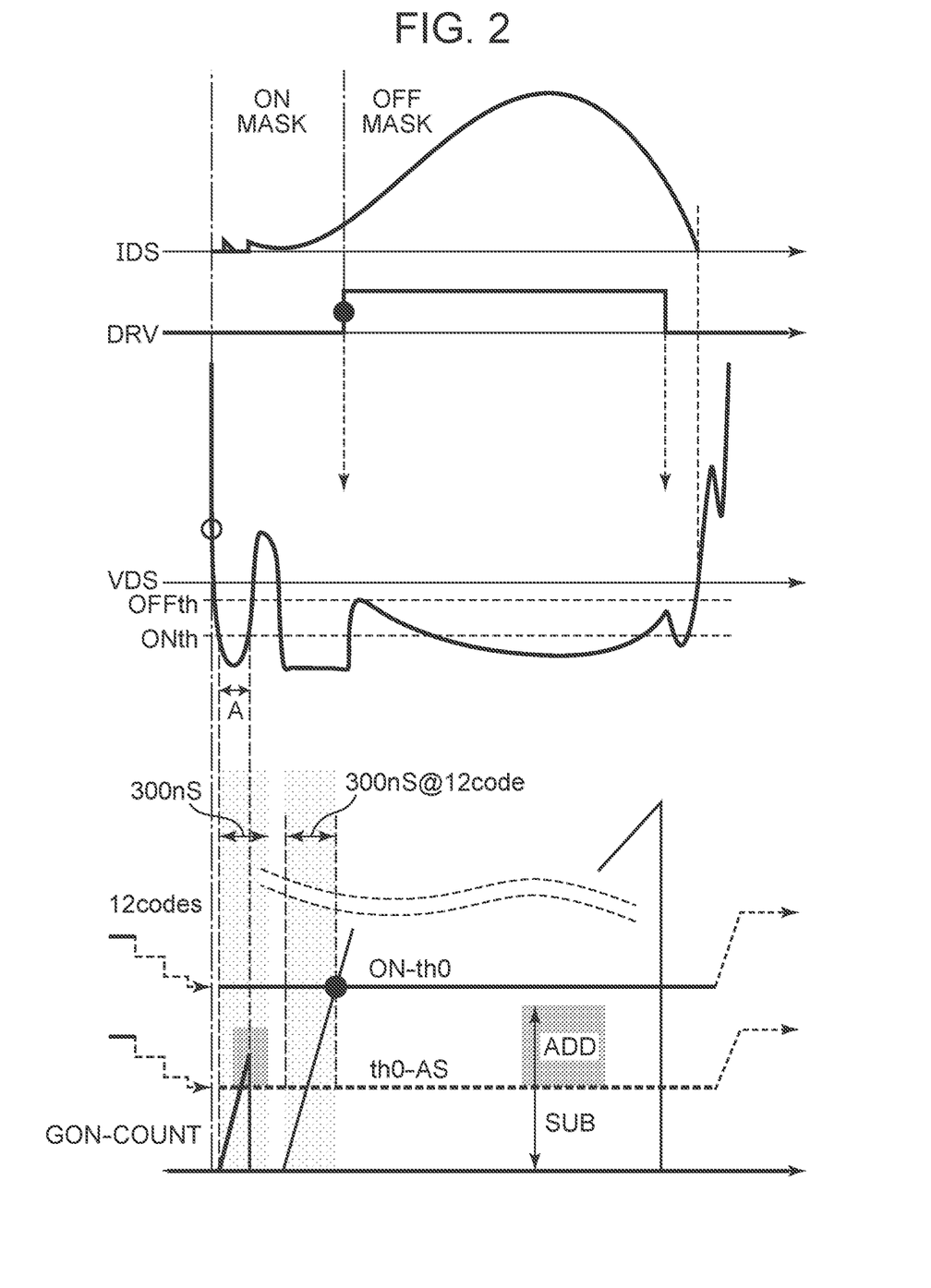
FIG. 2 is a waveform diagram illustrating an operation of the switching power supply apparatus according to one or more embodiments.

FIG. 2 is a waveform diagram illustrating an operation of the switching power supply apparatus according to one or more embodiments. A horizontal axis indicates time. A waveform IDS indicates a drain current of the switching circuit 312, and a waveform DRV indicates a drive voltage applied to a gate of the switching circuit 312. According to one or more embodiments, the waveform DRV may be an output voltage DRV from the gate driver 570. A waveform VDS indicates a drain-to-source voltage of the switching circuit 312. A power supply (not illustrated in the figure) is connected to the input terminals T1 and T2 of the resonance circuit 100 on the primary side, and voltage is supplied to the resonance circuit 100 on the primary side. A load is connected to the output terminals T3 and T4 of the rectification smoothing circuit 300 on the secondary side. Therefore, the switching power supply apparatus according to one or more embodiments is put into an operation.

As illustrated in the waveform IDS, a capacitive current flows due to a parasitic capacitance (Cs) on the secondary side. The capacitive current is observed as a current spike during the initial period when a current begins to flow through body diodes of the switching circuit 311 and the switching circuit 312. When a load current is large, a rectification current flows simultaneously with the current spike, but when the load current is small, the rectification current flows after the current spike oscillates and flows. Therefore, in a synchronous rectification switching power supply apparatus, when the switching circuit 312 or the switching circuit 311 is turned on by the capacitive current, reverse current flows from the smoothing capacitor 313 to the switching circuit 312 or the switching circuit 311. The rectification current increases to make up the discharged current, and the increased circuit current causes a loss, resulting in a decrease in efficiency.

Therefore, the ON counter 520 counts in a predetermined cycle during the period when the drain-to-source voltage VDS of the switching circuit 312 is below a threshold value ONth (a period A in FIG. 2), and stores the counted value as the ON count value (GON-COUNT). As illustrated in FIG. 2, GON-COUNT increases when the drain-to-source voltage VDS of the switching circuit 312 is lower than ONth. The second comparator 524 receives the stored ON count value and the decreased ON threshold value th0-AS and compares the ON count value (GON-COUNT) with the decreased ON threshold value th0-AS at a predetermined interval. The second comparator 524 outputs the result of the comparison between the ON count value (GON-COUNT) and the decreased ON threshold value th0-AS. When the drain-to-source voltage VDS becomes higher than the threshold value ONth, the ON count value (GON-COUNT) is reset.

The ON-mask time adjuster 526 receives the comparison result output by the second comparator 524 and increases the ON threshold value ON-th0 and the decreased ON threshold value th0-AS when the ON count value (GON-COUNT) is detected to be greater than the decreased ON threshold value th0-AS for a predetermined number of times. On the other hand, when the number of times that the ON count value (GON-COUNT) is detected to be greater than the decreased ON threshold value th0-AS is the predetermined number of times or less, the ON threshold value ON-th0 and the decreased ON threshold value th0-AS is decreased. Regarding the increase or decrease of the ON threshold value ON-th0, the increase of the ON threshold value ON-th0 may be freely determined by various settings. For example, the ON threshold value ON-th0 may be increased by 1 when the ON count value (GON-COUNT) is detected to be greater than the decreased ON threshold value th0-AS two or more times. For example, the ON threshold value ON-th0 may be decreased by 1 when the ON count value (GON-COUNT) is detected to be greater than the decreased ON threshold th0-AS one time.

The ON-mask time adjuster 526 increases or decreases the numerical value of the ON threshold value ON-th0 as necessary and outputs the updated ON threshold value ON-th0. The ON-mask time adjuster 526 also updates the numerical value of the decreased ON threshold value th0-AS and outputs the updated decreased ON threshold value th0-AS. The first comparator 522 inputs the ON counter value (GON-COUNT) and the ON threshold value ON-th0 updated by the ON-mask time adjuster 526, compares a counter value of the ON counter 520 with the ON threshold value ON-th0, and outputs the first comparison signal when the counter value of the ON counter 520 and the ON threshold value ON-th0 match. The SR latch 560 receives the first comparison signal output by the first comparator 522 and outputs a PWM signal at a predetermined timing. The gate driver 570 receives the PWM signal output by the SR latch 560 and applies the drive voltage DRV to the gate of the switching circuit 312. As a result, the switching circuit 312 operates. The ON-mask time adjuster 526 adjusts the mask time by operating repeatedly.

12 codes may be set as an initial value of the ON threshold value ON-th0. In that case, when the clock signal period is 25 nSec, the initial value of the ON threshold value ON-th0 may set to 300 nSec. When the ON-mask time adjuster 526 increases the ON threshold value ON-th0 by 1 code, the initial value of the ON threshold value ON-th0 may be set at 13 codes from the initial value of 12 codes, for example. In that case, when the clock signal period is 25 nSec, the initial value of the ON threshold value ON-th0 may be set to 325 nSec. When the ON-mask time adjuster 526 decreases the ON threshold value ON-th0 by 1 code, the initial value of the ON threshold value ON-th0 may be set at 11 codes from the initial value of 12 codes, for example. In that case, when the clock signal period is 25 nSec, the initial value of the ON threshold value ON-th0 may be set to 275 nSec. The decreased ON threshold value th0-AS may be smaller than the ON threshold value ON-th0. For example, the decreased ON threshold value th0-AS may be set between 25% and 99% of the ON threshold value ON-th0, or the decreased ON threshold value th0-AS may be set to 25%, 50%, or 75%. In particular, setting the decreased ON threshold value th0-AS to 75% of the ON threshold value ON-th0 may be desirable from a design or cost perspective. The ON-mask time adjuster 526 may update the decreased ON threshold value th0-AS based on the updated ON threshold value ON-th0 when updating the ON threshold value ON-th0. For example, when updating the ON threshold value ON-th0, the decreased ON threshold value th0-AS may be set to 75% of the updated ON threshold value ON-th0.

Thus, the ON-mask time adjuster 526 adjusts the time to perform the mask by operating repeatedly. A switching power supply apparatus according to one or more embodiments detects the current flowing in the SR-FET and generates the mask time from the time the current starts flowing in the body diode until a switching circuit is turned on and apply the mask time to the timing of the next SR-FET is turned on. Therefore, the reverse current due to the oscillation that occurs during the turn-on of the synchronous rectification SR-FET may be reduced. As described above, the switching power supply according to one or more embodiments may mitigate the reduction in efficiency of the switching power supply due to reverse current.

Second Embodiment

A switching power supply apparatus according to one or more embodiments is described. In FIG. 1, a switching power supply apparatus according to a second embodiment or embodiments further includes a logic circuit 528, an OFF counter 530, and a third comparator 532.

The detector 510 detects the voltage polarity of the switching circuit 312. The detector 510 receives at least a portion of the current flowing in the switching circuit 312. The voltage associated with the current may be referred to as VDS. The voltage VDS is the drain-to-source voltage of the switching circuit 312. The detector 510 receives the voltage VDS, compares the voltage VDS with a threshold value OFFth, and outputs a second detection signal 514.

The logic circuit 528 receives the second detection signal 514 and the PWM signal output by the comparator 510. The logic circuit 528 outputs a logical negation (NOT) of the second detection signal 514 output by the detector 510 and a logical OR (AND) of the PWM signal.

The OFF counter 530 receives the output of the logic circuit 528 and the clock signal CLK. The OFF counter 530 counts in a predetermined cycle during the period when the drain-to-source voltage VDS of the switching circuit 312 is above a threshold value OFFth. The third comparator 532 receives an OFF count value (OFF-COUNT) output by the OFF counter 530 and a threshold value OFFth0. The third comparator 532 compares the OFF count value (OFF-COUNT) with a threshold value OFFth0. When the OFF count value (OFF-COUNT) is greater than the threshold value OFFth0, the third comparator 532 outputs a comparison result signal to increase the ON threshold value ON-th0; in other occasions, the third comparator 532 outputs the third comparison signal not to increase or decrease the ON threshold value ON-th0. When the OFF count value (OFF-COUNT) is greater than the threshold value OFFth0, the third comparator 532 increases the threshold value OFFth0, and the increased threshold value OFFth0 is used in the next comparison.

The ON-mask time adjuster 526 receives the comparison result signal output by the second comparator 524 and the comparison result signal output by the third comparator 532. When the ON-mask time adjuster 526 detects that the ON count value (GON-COUNT) is greater than the decreased ON threshold value th0-AS a predetermined number of times and receives the comparison result to increase the threshold value ON-th0 by a comparison result signal of the third comparator 532, the ON-mask time adjuster 526 increases the ON threshold value ON-th0. On the other hand, when the number of times that the ON count value (GON-COUNT) is detected to be greater than the decreased ON threshold value th0-AS is the predetermined number or less, the ON-mask time adjuster 526 decreases the ON threshold value ON-th0. Regarding increase and decrease of the ON threshold value ON-th0, the increase of the ON threshold value ON-th0 may be freely determined by various settings. The ON threshold value ON-th0 may be increased by 1 when the ON count value (GON-COUNT) is detected to be greater than the decreased ON threshold value th0-AS two or more times. The ON threshold value ON-th0 may also be increased by 1 when the OFF count value (OFF-COUNT) exceeds the threshold value OFFth0. The ON threshold value ON-th0 may be decreased by 1 when the ON count value (GON-COUNT) is detected less than twice as being greater than the decreased ON threshold value th0-AS. The ON-mask time adjuster 526 increases or decreases the numerical value of the ON threshold value ON-th0 as necessary and outputs the updated ON threshold value ON-th0. The first comparator 522 inputs the ON counter value (GON-COUNT) and the ON threshold value ON-th0 updated by the ON-mask time adjuster 526, compares the counter value of the ON counter 520 with the ON threshold value ON-th0, and outputs the first comparison signal when the counter value of the ON counter 520 and the ON threshold value ON-th0 match. The SR latch 560 receives the first comparison signal output by the first comparator 522 and outputs the PWM signal at a predetermined timing. The gate driver 570 receives the PWM signal output by the SR latch 560 and applies the drive voltage DRV to the gate of the switching circuit 312. As a result, the switching circuit 312 operates.

Figure 3:
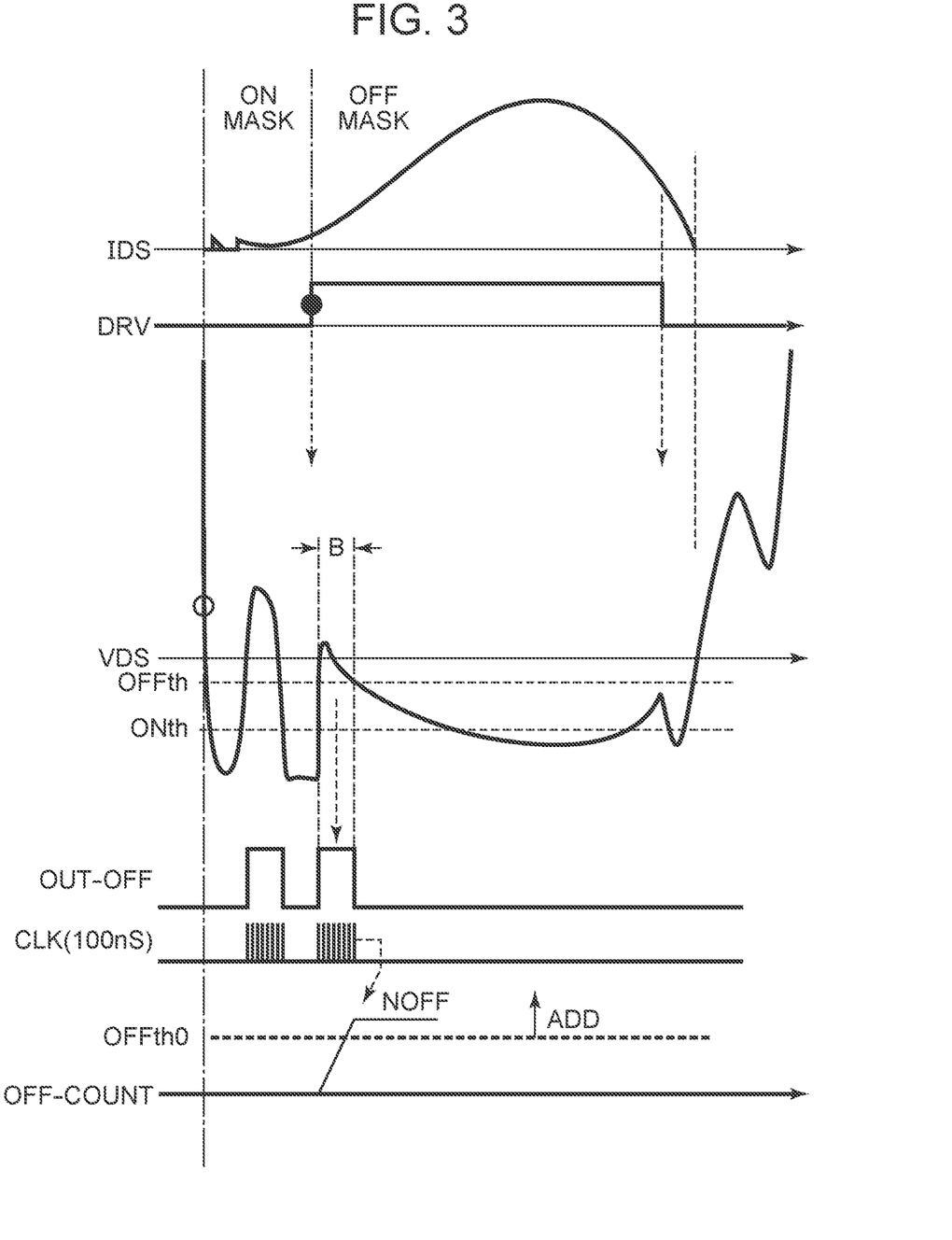
FIG. 3 is a waveform diagram illustrating an operation of a switching power supply apparatus according to a second embodiment or embodiments.

FIG. 3 is a waveform diagram illustrating an operation of the switching power supply apparatus according to a second embodiment or embodiments. The horizontal axis indicates time. A waveform IDS illustrates a drain current of the switching circuit 312, and a waveform DRV illustrates a voltage applied to a gate of the switching circuit 312. According to one or more embodiments, the waveform DRV may be an output signal from the gate driver 570. A waveform VDS indicates a drain-to-source voltage of the switching circuit 312. First, after the drain current IDS flows through the body diode, When the drain-to-source voltage VDS of the switching circuit 312 is once below the threshold value ONth and then exceeds the threshold value OFFth, an Out-OFF signal is turned on (period B in FIG. 3). Thereafter, when the drain-to-source voltage VDS of the switching circuit 312 becomes smaller than the threshold value OFFth, the Out-OFF signal goes to an OFF state. A waveform CLK indicates a clock signal, and the clock period is 100 nSec. A waveform OFF-COUNT is a value counted in a predetermined cycle during the period when the drain-to-source voltage VDS of the switching circuit 312 is at the threshold value OFFth or above. The count value OFF-COUNT is counted when the voltage DRV applied to the gate of the switching circuit 312 is an ON state. When the count value OFF-COUNT exceeds the threshold value OFFth0, the OFF counter 530 increases and stores the threshold value OFFth0 by a predetermined amount. The third comparator 532 conducts a comparison using the threshold value OFFth0 increased by the OFF counter 530 in the next cycle. The OFF counter 530 also increases the ON threshold value ON-th0. The threshold value OFFth may use the hysteresis of ONth. In other words, cost-down may be achieved by configuring with a single hysteresis comparator.

Thus, the ON-mask time adjuster 526 adjusts the time for masking by operating repeatedly. The switching power supply apparatus according to a second embodiment or embodiments, detects the current flowing in the SR-FET, generates the mask time from the moment the current starts flowing in the body diode to the moment the switching circuit is turned on, and applies the mask time to the timing of the next SR-FET to be turned on. Therefore, the reverse current due to the oscillation that occurs during the turn-on of the synchronous rectification SR-FET may be reduced. As described above, the switching power supply apparatus according to one or more embodiments may mitigate the reduction in efficiency of the switching power supply apparatus due to reverse current. Compared to the switching power supply apparatus according to a first embodiment or embodiments, ON-masking may be performed with higher accuracy.

Third Embodiment

Figure 4:
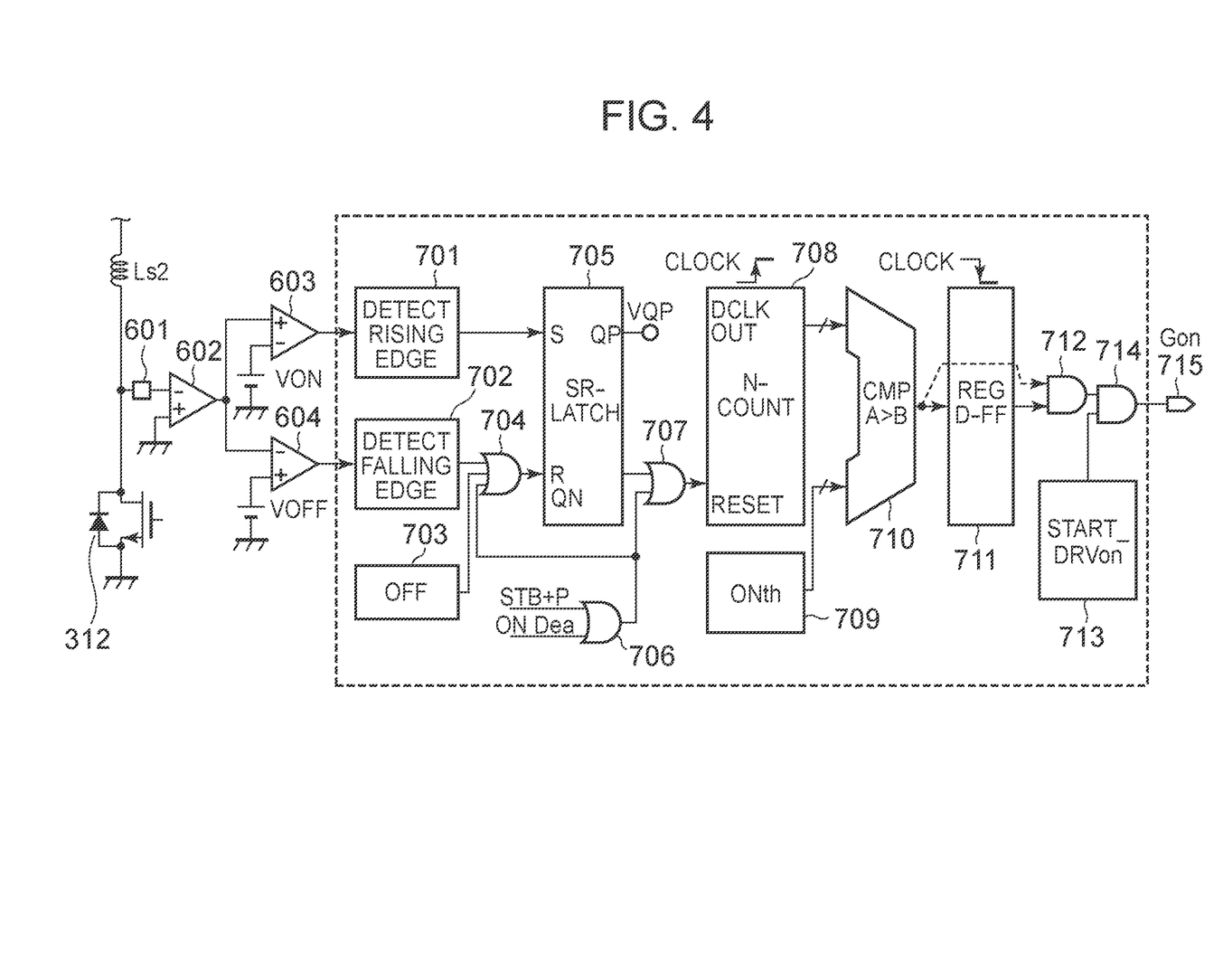
FIG. 4 is a circuit diagram illustrating a switching power supply apparatus according to a third embodiment or embodiments.

FIG. 4 is a circuit diagram illustrating the switching power supply apparatus according to a third embodiment or embodiments. The switching power supply apparatus includes a preamplifier 602 electrically connected to a VD terminal 601 to which the drain-to-source voltage VDS of the switching circuit 312 is applied, a comparator 603 that receives an output of the preamplifier 602, a comparator 604 that receives an output of the preamplifier 602, a rising edge detecting circuit 701 that detects a rising edge, a falling edge detecting circuit 702 that detects a falling edge, an OFF system circuit 703, an OR circuit 704, a SR-latch 705, an OR circuit 706, an OR circuit 707, an N-COUNT circuit 708, an ON-mask time adjust circuit 709, a comparison circuit 710, a D-type FLIP FLOP circuit 711, an AND circuit 712, a gate drive circuit 713, an AND circuit 714, and a GON output terminal 715.

The detector 510 illustrated in FIG. 1 may include the preamplifier 602, the comparator 603, the comparator 604, the rising edge detecting circuit 701, the falling edge detecting circuit 702 to detect the falling edge, the OR circuit 704, and the SR-latch 705, and these elements may process the detector 510. The ON counter 520 may include the N-COUNT circuit 708, and the element may process the ON counter 520. The second comparator 524, the ON-mask time adjuster 526, the logic circuit 528, the OFF counter 530, and the third comparator 532 may be processed by the ON-mask time adjust circuit 709. The first comparator 522 may include the comparison circuit 710, and the first comparator 522 may be performed by the comparison circuit 710. Processing of the SR latch 560 and the gate driver 570 may be performed by the D-type FLIP FLOP circuit 711, the AND circuit 712, the gate drive circuit 713, the AND circuit 714, and the GON output terminal 715.

Although one or more embodiments as described above herein may be directed to devices having a particular arrangement of layers with conductivity types, e.g. N, N+, P, and so on, other embodiments may be directed to devices in which the conductivity types are reversed or otherwise modified. Furthermore, the above-described aspects may be combined with each other as practicable within the contemplated scope of embodiments. The above-described embodiments are to be considered in all respects as illustrative, and not restrictive. The illustrated and described embodiments may be extended to encompass other embodiments in addition to those specifically described above without departing from the intended scope of the invention. The scope of the invention is to be determined by the appended claims when read in light of the specification including equivalents, rather than solely by the foregoing description. Thus, all configurations including configurations that fall within equivalent arrangements of the claims are intended to be embraced in the invention.

The invention claimed is:

1. A switching power supply apparatus comprising:
    a series resonance circuit on a primary side;
    a rectification smoothing circuit on a secondary side; and
    a transformer that comprises a first coil connected to the series resonance circuit on the primary side and a second coil connected to the rectification smoothing circuit on the secondary side, a current produced in the second coil in response to a current in the first coil; wherein:
    the rectification smoothing circuit on the secondary side comprises:
        a switching circuit connected in series with the second coil, the switching circuit configured for providing synchronous rectification; and
        a secondary-side control circuit that controls ON and OFF of the switching circuit, the secondary-side control circuit comprising:
            a detector that compares a drain voltage of the switching circuit with a first threshold voltage and outputs a first detection signal;
            an ON counter that detects a period of time during which current flows in the switching circuit based on the first detection signal, counts the period of time based on a predetermined clock cycle, and outputs an ON count value;
            a first comparator that receives the ON count value and an ON threshold value and outputs a first comparison signal in response to the ON count value and the ON thresh old value matching;
            a second comparator that receives the ON count value and a decreased ON threshold value, compares the ON count value and the decreased ON threshold value, and outputs a second comparison signal;
            an ON-mask time adjuster that receives the second comparison signal and outputs the ON threshold value for adjusting a mask time and the decreased ON threshold value that is less than the ON threshold value; and
            an (set-reset) SR-latch that receives the first comparison signal and outputs a PWM signal to be applied to a gate of the switching circuit, wherein:
    the detector compares the drain voltage of the switching circuit with a second threshold voltage and outputs a second detection signal;
    the secondary-side control circuit further comprises:
        an OFF counter that detects a period of time during which current flows in the switching circuit based on the second detection signal, counts the period of time based on the predetermined clock cycle, and outputs an OFF count value; and
        a third comparison circuit that receives the OFF count value, compares the OFF count value with an OFF threshold value, and outputs a third comparison signal; and
    the ON-mask time adjuster receives the second comparison signal and the third comparison signal and outputs the ON threshold value for adjusting the mask time and the decreased ON threshold value that is less than the ON threshold value.

2. The switching power supply apparatus according to claim 1, wherein
    the ON-mask time adjuster increases the ON threshold value and the decreased ON threshold value when the ON-mask time adjuster detects that the ON count value is greater than the decreased ON threshold value for a predetermined number of times.

3. The switching power supply apparatus according to claim 2, wherein
    the ON-mask time adjuster increases the ON threshold value and the decreased ON threshold value when the ON-mask time adjuster detects that the ON count value is greater than the decreased ON threshold value two times.

4. The switching power supply apparatus according to claim 2, wherein
    the decreased ON threshold value is set between 25% and 99% of the ON threshold value.

5. The switching power supply apparatus according to claim 2, wherein
    in response to the switching circuit being turned on, the OFF counter detects the period during which current flows in the switching circuit based on the second detection signal, counts the period based on the predetermined clock cycle, and outputs the OFF count value.

6. The switching power supply apparatus according to claim 2, wherein
    the ON-mask time adjuster increases the ON threshold value and the decreased ON threshold value when the ON-mask time adjuster detects that the OFF count value is greater than the OFF threshold value for a second predetermined number of times.

7. The switching power supply apparatus according to claim 2, wherein
    the ON-mask time adjuster increases the ON threshold value and the decreased ON threshold value when the ON-mask time adjuster detects that the OFF count value is greater than the OFF threshold value one time.

8. The switching power supply apparatus according to claim 1, wherein
    the ON-mask time adjuster decreases the ON threshold value when a number of times that the ON-mask time adjuster detects that the ON count value is greater than the decreased ON threshold value is less than or equal to a predetermined number.

9. The switching power supply apparatus according to claim 1, wherein
    the ON-mask time adjuster decreases the ON threshold value when a number of times that the ON-mask time adjuster detects that the ON count value is greater than the decreased ON threshold value is less than two times.

* * * * *